INVENTOR.
BERNARD T. HENSGEN
OGDEN A. CLEMENS
JACK ADAMS
BY R. L. Story
ATTORNEY

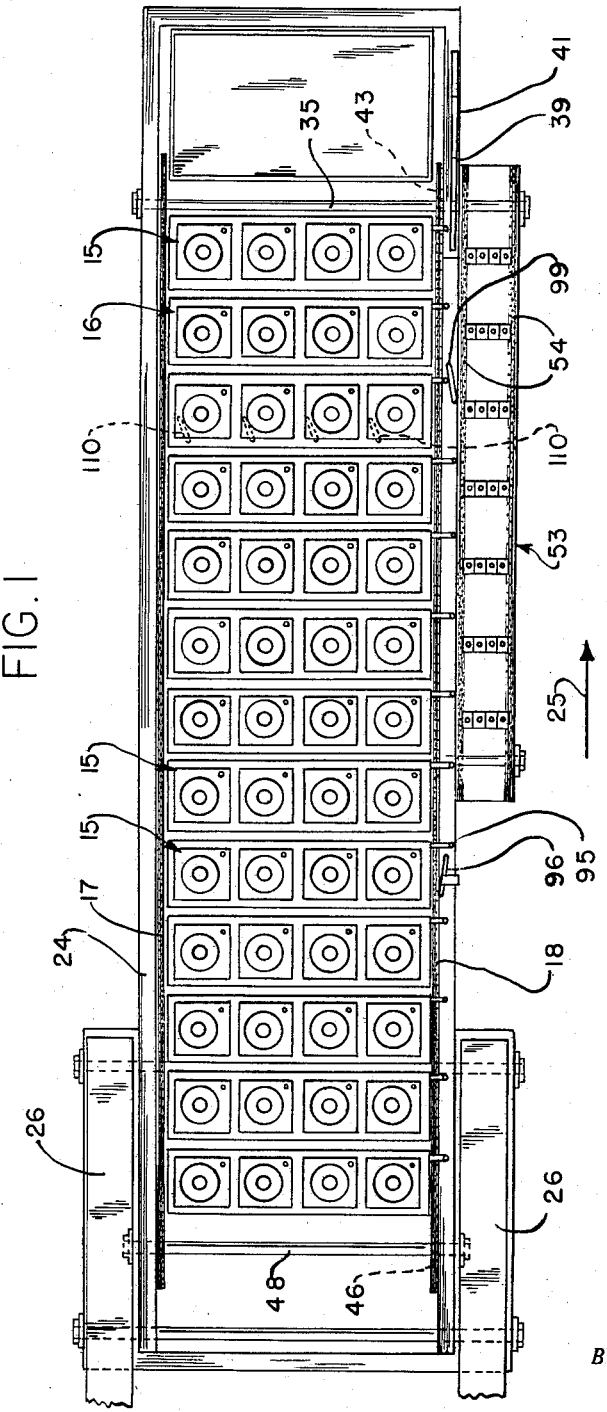
JACK ADAMS
BERNARD T. HENSGEN
OGDEN A. CLEMENS JR.
*INVENTORS*
BY R. L. Story
ATTORNEY Sept. 27, 1955 J. ADAMS ET AL 2,718,906
EGG SEPARATING MACHINE
Filed Sept. 18, 1951 4 Sheets-Sheet 2
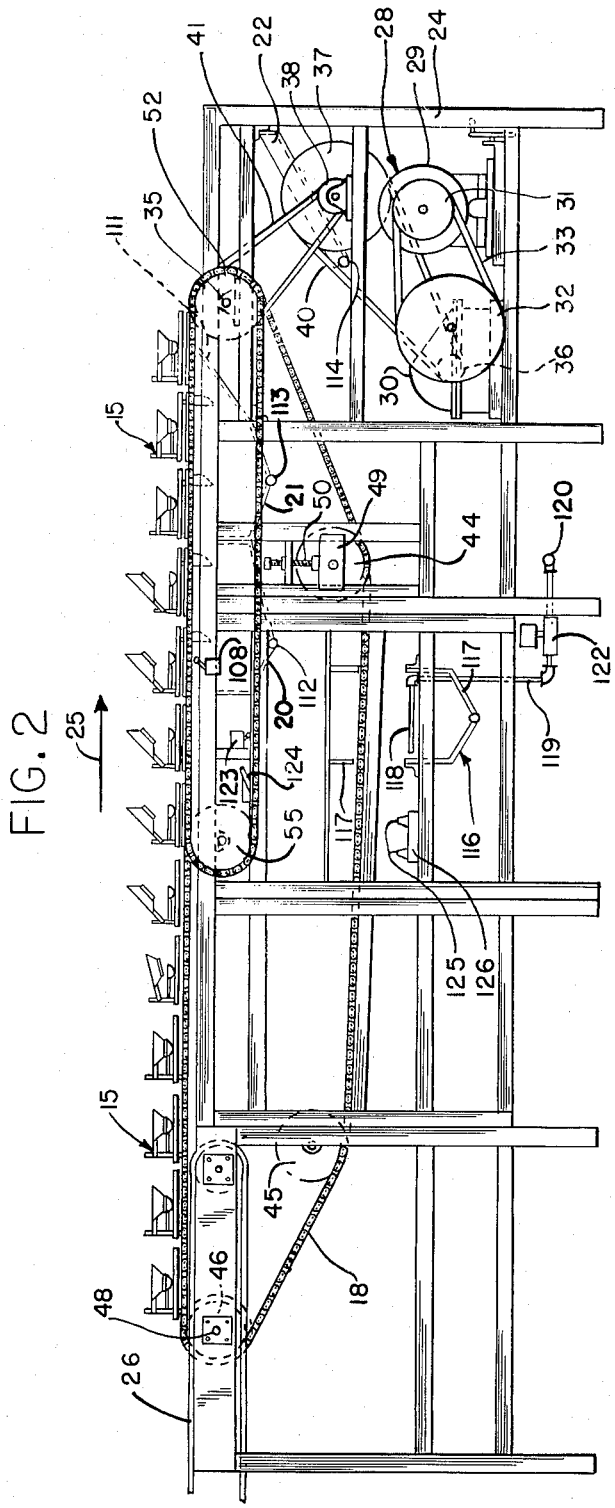
JACK ADAMS
BERNARD T. HENSGEN
OGDEN A. CLEMENS JR.
INVENTORS
BY R. L. Story
ATTORNEY Sept. 27, 1955    J. ADAMS ET AL    2,718,906
EGG SEPARATING MACHINE
Filed Sept. 18, 1951    4 Sheets-Sheet 3
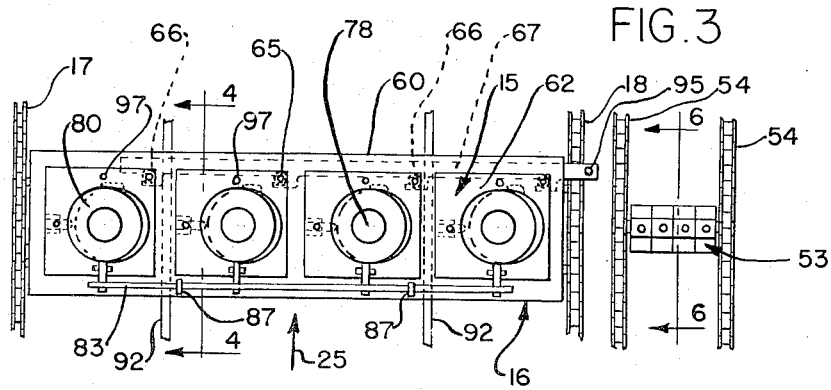
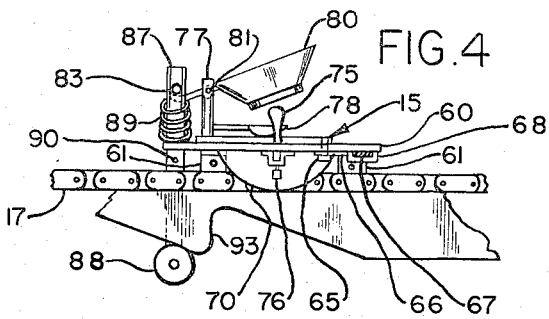
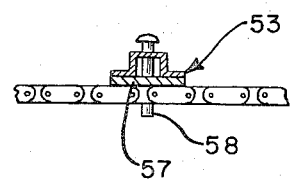
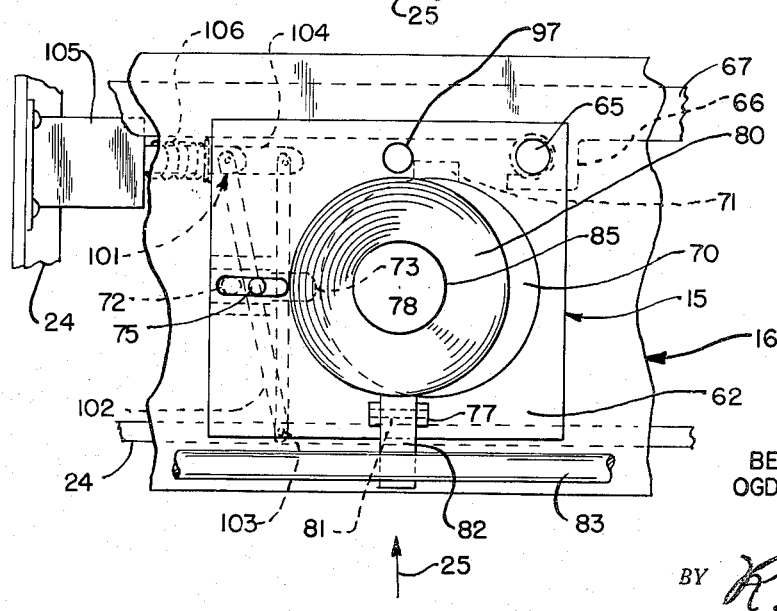
JACK ADAMS
BERNARD T. HENSGEN
OGDEN A. CLEMENS JR.
*INVENTORS*
BY *R. S. Story*
ATTORNEY Sept. 27, 1955  J. ADAMS ET AL  2,718,906
EGG SEPARATING MACHINE
Filed Sept. 18, 1951  4 Sheets-Sheet 4

United States Patent Office 2,718,906
Patented Sept. 27, 1955

2,718,906

EGG SEPARATING MACHINE

Jack Adams, Bernard T. Hensgen, and Ogden A. Clemens, Jr., Chicago, Ill., assignors to Swift & Company, Chicago, Ill., a corporation of Illinois Application September 18, 1951, Serial No. 247,144

6 Claims. (Cl. 146—2)

The present invention relates to an apparatus for the separation of eggs.

In preparing eggs for quantity usage, a common practice is to separate the whites and yolks of the eggs as the contents are removed from the shells. This is particularly true when the eggs are destined for use in fields where for one reason or another only the yolk or the white is desired for a specific purpose. One example is the baking industry where the whites are processed alone because of the more satisfactory beating results obtained.

In many instances, the facilities for breaking, separating, and packing the eggs are located in the general area where the eggs are produced in order to reduce the problems attendant with the handling and shipping of shell eggs. After breaking and separating, the eggs may be dehydrated or frozen to improve the keeping qualities and to substantially eliminate any deterioration during the period before they are used.

For many years the breaking, sorting and separating have been accomplished solely by hand operations. However, in plants where the volume of eggs was large, the expenditure for labor involved has been a substantial cost factor. Efforts have been made to reduce these costs by the development of machinery to replace all or a part of the hand labor.

In the majority of instances the apparatus which sought to supplant the major portion of the hand operations has failed to achieve success in the industry. As a generalization, the reason for this situation has been the necessity for treating each egg individually in a manner dictated by conclusions drawn from a physical observation of the egg after it is broken.

For example, in some cases the spoiled eggs are detected by smell while in other cases by their appearance under an ultraviolet light, but in each instance the egg must be discarded. In some cases, the yolk is broken and mingles with the white as the shell is opened while in other cases the yolk breaks as the white is being removed therefrom, but in each instance the egg must be placed in another receptacle than those used for the separated whites and yolks. Another factor that creates complications is the variation in size of the whites and yolks even though an effort is made to classify the eggs by size before breaking.

The principal object of the present invention is to provide an apparatus which will not only separate the whites from the yolks of the eggs after breaking, but which will facilitate the proper classification of the eggs and disposal of the eggs according to such classification. This is achieved by passing the individual eggs in readily observable state through an inspection station where the human judgment factor may be applied to classify the eggs, and by providing means for the dumping of the eggs into suitable receptacles according to the decision of the operator.

A further object is to substantially eliminate the addition of any matter into the egg white receptacle other than egg white. The quality of the egg whites and their value to a baker is greatly influenced by whether substances other than egg whites have been commingled with the whites. The addition of yolk from eggs in which the egg yolks have broken or water used in any cleaning operations are examples of what may be termed "foreign substances" in the egg whites.

A particular feature of the present invention is that the last-mentioned object is achieved without sacrificing any white yield from the volume of eggs that are broken. The separation and maintenance of high quality whites are handled so that it is not necessary, in order to maintain the quality of the contents of the egg white receptacle, to dump certain of the usable egg whites into other than the egg white receptacle.

Additional objects and advantages include: A device which is simple to use and which requires no special training of operators; a device embodying conventional machine parts for many of its structural details thus making it easily constructed and maintained even by labor having only ordinary skills; and a device which will greatly reduce the processing costs involved in egg breaking and separating.

Other objects and advantages will become apparent from the following description taken in conjunction with the drawings in which:

Fig. 1 is a plan view of an embodiment of the present invention;

Fig. 2 is a side elevation of the embodiment of Fig. 1;

Fig. 3 is an enlarged plan view of one flight of egg separating cups;

Fig. 4 is a section taken at line 4—4 of Fig. 3;

Fig. 5 is an enlarged plan view of an egg cup showing the latch release mechanism;

Fig. 6 is a section taken at line 6—6 of Fig. 3; and

Figure 7:
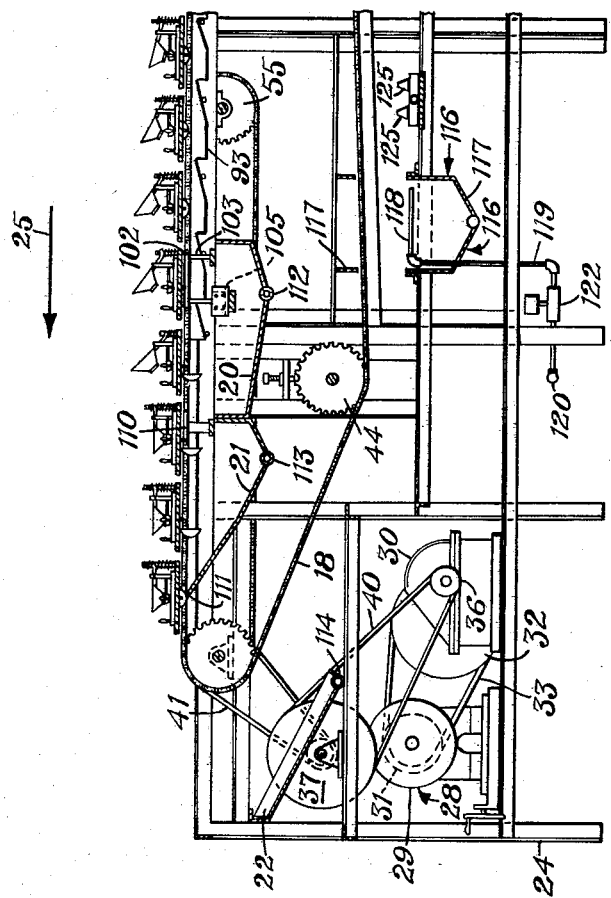
Fig. 7 is a partial longitudinal section.

The illustrated embodiment comprises a plurality of flights of individual egg separating cups generally 15. The egg separating cups 15 are mounted on flight carriers generally 16 suspended between a pair of endless chains 17 and 18 forming conveyors for the cups. The breaking, inspecting, and sorting of the eggs is performed as the cups more across the top flight of the conveyor which is substantially horizontal. Receptacles 20, 21, and 22 are positioned below this flight to receive the distributed contents of good eggs.

The device is mounted upon a frame 24 of such a size as to bring the top flight of the conveyor to a convenient working height. The beginning of the top flight, with respect to the direction of movement of the conveyor, as illustrated by arrow 25, forms the egg breaking station. The shell eggs are delivered to this station on feed conveyors 26 from which they are removed by the operator and broken into cups 15, a single egg to each cup.

From the egg breaking station, the egg cup conveyor moves the cups 15 to the inspection and separating stations. To accomplish this, chains 17 and 18 are moved by a power-driving means generally 28. As is seen in Fig. 2, a motor 29 drives a speed reducer 30 through pulleys 31 and 32 and a connecting belt 33. Similarly, the speed reducer 30 is operatively connected to a shaft 35, upon which the chains are mounted, through pulleys 36, 37, 38, and 39 and belts 40 and 41. It will be noted in each instance the driving pulley is smaller than the driven pulley to provide speed reduction.

Chains 17 and 18 pass over a plurality of sprockets 43, 44, 45, and 46 forming the supporting wheel structure for the conveyor. Sprockets 43 and 46 are mounted on shafts 35 and 48 respectively, which shafts are suitably journaled in bearings on frame 24. Sprocket 45 is merely an idler to position the bottom run of the chains well below the top run. Sprocket 44, in addition to positioning the bottom run well below the top run, also serves as a chain tightener. For this purpose, sprocket 44 is rotatively mounted in slides 49 which may be pushed downwardly to tighten the chain 18 by positioning bolts 50 threaded through a portion of frame 24.

Also mounted on shaft 35 are sprockets 52 to carry the selector mechanism, generally 53, for the dumping of the cups. Spaced chains 54 are mounted on sprockets 52 and adjacent the center of the machine pass over a pair of idler sprockets 55. Mounted between chains 54 are a plurality of support plates 57 (Fig. 6) carrying switch actuating plungers 58. The number of plungers 58 used in each plate 57 is equal to the number of egg separating cups in a flight. In the instant case, there are four plungers 58, each identified with one of the four cups in the flight. The plungers 58 are vertically movable with respect to support plates 57 and sufficient friction is employed in the mounting so that the plungers 58 will hold a given position until force is applied to move the plunger to a new position. The length of chains 54 is such that one of the plates 57 will maintain a predetermined relative position with respect to a flight of cups during the period of time that the cups travel along the latter portion of the upper run of the cup conveyor and the first portion of the lower run.

The mounting of the cups 15 on the conveyor is best seen in Figs. 3 and 4. A carrier plate 60 of each flight carrier 16 is attached to chains 17 and 18 by means of brackets 61. Each carrier plate 60 has four openings, one for each of egg separating cups 15. The body 62 of cups 15 form a base which overlies the opening in carrier plate 60.

At one corner of body 62 of the cups 15 is a downwardly projecting headed pin 65. A plurality of catches 66 mounted on a bar 67 engage above the head of pins 65 to hold the cups 15 in place on the carrier. The bar 67 is mounted in a plurality of brackets 68 attached to the bottom of carrier plate 60. Brackets 68 permit the bar to be slid back and forth in a direction transverse to the path of movement 25 of the conveyor.

Egg separating cups 15 include a white compartment 70 positioned below an opening in body 62 and attached to the body by means of a hinge 71 at the forward end, with respect to direction of movement, of the egg cup. A spring loaded latch 72 has a tongue 73 which engages a side of white compartments 70 to normally hold the white compartment up against the body 62. Latch 72 has upwardly and downwardly projecting handles 75 and 76 respectively. The handles 75 and 76 are attached to tongue 73 in order that the tongue may be pulled back to allow the white compartment 70 to pivot about hinge 71 to open.

Projecting upwardly from body 62 is a post 77 to which is secured yolk cup 78. The yolk cup 78 is positioned above the white compartment 70 when the latter is closed and preferably to one side of the center of white compartment. As will be seen in Fig. 3, the yolk cup is positioned away from the side of the machine occupied by selector mechanism 53. This positioning affords the inspector a better view of the interior of the white compartment when he is standing in the normal position beside selector mechanism 53.

Above the yolk cup 78 is a funnel-shaped clipper 80 pivotally mounted on post 77 by means of a pin 81. Projecting rearwardly from clipper 80 is an arm 82 which engages under a bar 83 of the clipper actuating mechanism.

The yolk cup 78 is semispherical and of a size to only accommodate the largest yolks of whatever eggs are to be handled in the egg separator. The bottom opening 85 of the funnel-shaped clipper 80 is substantially the same size as the upper edge of the interior of yolk compartment 78 and is positioned concentric therewith. The bottom face of the clipper 80 is flat and cooperates with the upper edge of the yolk compartment 78 to snip the white from about the yolk.

A rod 83 is attached to a cam follower mechanism comprising vertical pieces 87 passing through carrier plate 60 and rollers 88 secured to the bottom end of vertical pieces 87. A spring 89 between carrier plate 60 and rod 83 urges the cam follower mechanism upwardly until restrained by a stop pin 90. A pair of cams 92 mounted on frame 24 cooperate with the follower mechanism to move the clipper up and down. As is seen in Fig. 4, the cams have a plurality of abrupt steps 93 which allow spring 89 to raise the cam follower and drop clipper 80 against the top of yolk cup 78. The positioning of the cams in frame 24 is such that shortly after the eggs are broken into the cups, the cam followers begin to actuate the clipper to successively raise and drop the clipper against the yolk compartment (see Fig. 2) after which the cam holds the clipper in a raised position to facilitate the inspection of the contents of the egg separating cup 15.

At the end of bar 67, which carries catches 66 to hold the egg cups 15 in place on the carrier 16, is a pin 95. As will be seen in Fig. 1, shortly after each flight leaves the egg breaking station, a cam 96 engages pin 95 to pull the bar 67 outwardly and free catches 66 from pins 65. At any time after bars 67 have been pulled outwardly, any of the egg separating cups 15 may be lifted from carriers 60. To facilitate grasping and lifting the egg separating cups from the carriers, a handle 97 is mounted on the front of each of the egg separating cup bodies 62. By lifting up on the front of the egg separating cups 15, the arm 82 of the clipper may be unhooked from under bar 83.

Adjacent the other end of the upper horizontal run is a second cam 99 to push bar 67 back in by engaging pin 95 and to again secure the egg separating cups 15 in place on the carriers 60 by hooking catch 66 above pin 65. Thus, when the carriers and cups are turned upside down while passing across the lower flight of the conveyor, the egg separating cups 15 will not fall from the conveyor.

To open the egg white compartments 70 over the first receptacle 20 there is provided an electrically actuated tripping means generally 101 (Fig. 5) for each longitudinal line of receptacles. Tripping means 101 mounted on a portion of frame 24 includes a movable cam 102 pivotally supported adjacent one end by means of a pin 103. Adjacent the other end of movable cam 102 the cam is secured to armature 104 of a solenoid 105. A spring 106 urges the armature outwardly from the solenoid. The pivoted cam 102 is positioned sufficiently above the solenoid and frame to engage downwardly projecting handles 76 of latch 72.

If the solenoid 105 is not energized, the cam 102 assumes the right hand position shown in Fig. 5 and the egg separating cup 15 passes by the cam 102 without the latter tripping the latch 72 to open the white compartment 70. However, if solenoid 105 is energized as an egg separating cup 15 is passing by, the cam 102 assumes the left hand position of Fig. 5 to pull latch 72 open and allow the white compartment 70 to pivot about hinge 71 to empty the contents of the white compartment into receptacle 20.

Four switches 108, such as lever actuated microswitches are positioned under the path of travel of the selector mechanisms 53. Each one of the four microswitches corresponds to one of the four plungers 58 and the lever of that microswitch is positioned to be actuated by plunger 58 if the latter is depressed. Each one of the four electrical tripping means 101 is wired in series with one of the switches 108 and with a suitable source of electrical power so that the actuating of any one of the switches will energize the corresponding solenoid 105 and release the egg white compartment 70 to place the contents of the selected white compartment 70 into receptacle 20.

Over receptacle 21 is a series of fixed cams 110 (Fig.

1) to engage handles 76 and release latches 72 of the egg separating cups 15. Any white compartments 70 which were not emptied into receptacle 20 will automatically be dumped into receptacle 21 by the fixed cams 110. At the end of receptacle 21, with respect to the direction of movement, the compartment wall forms a cam as shown at 111 in Fig. 2 to contact the bottom of white compartment 70 raising the compartment about hinge 71 and allowing the latch 72 to fasten the white compartment in place.

The contents of the yolk cups 78 are discharged into receptacle 22 as the egg separating cups 15 pass over the wheels 43 at the end of the horizontal run.

Receptacles 20, 21, and 22 have sump connections 112, 113, and 114 (Fig. 2) respectively to permit the contents of the receptacles to be withdrawn for use as desired.

Along the bottom run of the conveyor is a spray booth generally 116 through which the conveyor and egg separating cups pass. The booth 116 includes enclosed sides and bottom 117. Within the booth are four spray heads 118 each of which is positioned under the path traversed by one longitudinal line of egg separating cups. Each of spray heads 118 is a pipe laid parallel to the respective longitudinal line of cups and having a plurality of openings in the upper side thereof to permit the release of washing fluid. Four pipes 119 connect spray heads 118 to a suitable supply header 120. Between header 120 and each of spray heads 118 is an electrically operated valve 122.

Above the bottom run of the selector mechanism 53 are four electrical switches 123 such as the microswitches previously mentioned. Preferably the switches 123 are lever actuated with the levers positioned to contact one of plungers 58 if the latter have been depressed as the selector mechanism traversed the upper run. Each of microswitches 123 is connected in series with a suitable source of electrical power and one of the electrically actuated valves 122. As in the case of the solenoids 105, each of the microswitches 123 and electrical valves 122 correspond to one of the longitudinal runs of egg separating cups and the corresponding spray head 118 is positioned under that run.

Thus, if during the course of traversing the upper run one of the plungers 58 of the selector mechanism is depressed, that plunger will actuate the proper switch 108 and solenoid 105 to empty the contents of the white compartment 70 of the specific cup into receptacle 20 and, subsequently, will actuate the proper switch 123 and valve 122 to project a spray of washing fluid into the same cup 15 as it passes through spray booth 116. Beyond switch 123, with respect to the direction of movement, is a fixed cam 124 to engage plungers 58. Any plungers which have been depressed as just mentioned will be pushed outwardly by cam 124 in which position the plunger will fail to actuate either of switches 108 or 123 unless again depressed.

Along the bottom run of the cup conveyor and beyond spray booth 116 are drying jets 125. The jets project from and communicate with a drying fluid header 126 which is connected to a suitable source of drying fluid (not shown). Heated air is very satisfactory for this purpose.

From the foregoing, it will be seen that the construction and operation of the present invention is extremely simple. The shell eggs which are received on conveyors 26 are broken and their contents emptied into one of the cups as the cups rise to the beginning of the horizontal run of the conveyor. As the cups pass along the horizontal run, the clipper is actuated to sever the white from about the yolk.

An inspector views the contents of each of the cups preferably by light from an ultraviolet light (not shown), and if any of the eggs are bad, the inspector grasps that cup and removes it from the conveyor and empties it into a suitable receptacle (not shown). Preferably that cup is laid aside for washing and an extra, clean egg separating cup 15 is placed on the conveyor. Whether or not the replacement can be handled by the inspector will depend upon the speed at which the conveyor is operated and the number of cups in a flight on the conveyor. The removal and replacement of the egg separating cup 15 is permitted because of the unhooking of catches 66 during the course of the travel of the cup over the upper flight of the conveyor.

If the yolks of any of the eggs have become broken either at the time that they were dropped into the cups or during the course of the clipping of the white, the inspector depresses the plunger 58 corresponding to that cup. Because of the plunger being depressed, the white compartment of that cup is emptied into receptacle 20 and the cup is subsequently washed when it reaches spray chamber 116. Any cups 15 remaining on the conveyor and having unopened white compartments have the contents of that compartment emptied into receptacle 21 by cam 110 acting on handle 76. The white compartments are closed by cam 111 before the cup 15 reaches the end of the horizontal flight. As the cup passes over the end of the horizontal flight, the contents of the yolk compartment are dumped into receptacle 22.

Since receptacles containing spoiled eggs are removed entirely from the conveyor, there is no opportunity for the contents of the cups containing the spoiled eggs to become commingled with any of the contents of the good eggs. The whites of the eggs having broken yolks are emptied into receptacle 20 and do not spoil the quality of the egg whites received in receptacle 21. Those cups which have had broken yolks are washed which eliminates the possibility of any yolk remaining in the white compartment to be carried off with the egg whites of the egg subsequently broken into that cup, while washing only those specific cups lowers the possibility of any water from washed cups being carried over and dumped into the receptacles upon the next rotation of the conveyor. Although the air blast dryers 125 will substantially eliminate the wash water from the wash cups, the fewer cups that are washed the less possibility there is of water carry-over.

A number of changes will be apparent to those skilled in the art. For example, in some embodiments the tripping mechanism 101 may be eliminated and the white compartments emptied into the desired receptacles by the manual movement of handle 75 projecting above the body of the cup. The foregoing description of a specific embodiment is for the purpose of complying with 35 U. S. C. 112 and we wish it to be understood that we do not desire to be limited to the exact details of the construction shown and described.

We claim:

1. An egg separating machine including a plurality of egg separating cups, each of said cups having a body, a small yolk compartment and a larger white compartment, said yolk compartment being attached to said body and positioned above said white compartment, each cup having a hinge attaching one side of said white compartment to said body and a latch and handle therefor to releasably hold the white compartment below the yolk compartment, an endless conveyor mounted on a plurality of wheel means, power-driving means for said conveyor to move said conveyor in a given direction, means releasably attaching the bodies of said cups to said conveyor for movement of the cups in upright position along a portion of the path of the conveyor with said latch handle projecting to one side of said cups moving along said portion of the path, a pair of receptacles positioned consecutively below the cups in said portion of the path, a cam positioned to be engaged with the latch handle of a cup passing over the first, with respect to the direction of movement of the conveyor, receptacle of said pair, said cam being moveable from a first position whereat the latch of said cup will be unopened to a second position whereat said latch will be opened to drop the white container to dump the contents thereof into the first receptacle, means to move said cam from the first to the second position, a second cam positioned to engage with the latch handle of a cup passing over the second receptacle to release that latch, and a third receptacle at another portion of said path to receive the contents of the yolk compartments of said cups.

2. An egg separating machine including a plurality of egg separating cups, each of said cups having a body, a small yolk compartment and a larger white compartment, said yolk compartment being attached to said body and positioned above said white compartment, each cup having a hinge attaching one side of said white compartment to said body and a latch and handle therefor to releasably hold the white compartment below the yolk compartment, an endless conveyor mounted on a plurality of wheel means, power-driving means for said conveyor to move said conveyor in a given direction, means releasably attaching the bodies of said cups to said conveyor for movement of the cups in upright position along a portion of the path of the conveyor with said latch handle projecting to one side of said cups moving along said portion of the path, a pair of receptacles positioned consecutively below the cups in said portion of the path, a cam positioned to be engaged with the latch handle of a cup passing over the first, with respect to the direction of movement of the conveyor, receptacle of said pair, said cam being moveable from a first position whereat the latch of said cup will be unopened to a second position whereat said latch will be opened to drop the white container to dump the contents thereof into the first receptacle, electrically operated means to move said cam from the first to the second position, said electrically operated means including a switch for each cup passing along said portion, said means being energized to move said cam to said second position when said switch is actuated, a second cam positioned to engage with the latch handle of a cup passing over the second receptacle to release that latch, a third receptacle at another portion of said path to receive the contents of the yolk compartments of said cups, and electrically operated cup washing means positioned along said path beyond said portions, said washing means being operated by the actuated switches to wash only those cups which were dumped into the first receptacle.

3. An egg separating machine including a plurality of egg separating cups, each of said cups having a body, a small yolk compartment and a larger white compartment, said yolk compartment being attached to said body and positioned above said white compartment, each cup having a hinge attaching one side of said white compartment to said body and a latch to releasably hold the white compartment below the yolk compartment, an endless conveyor mounted on a plurality of wheel means, power-driving means for said conveyor to move said conveyor in a given direction, said cups being attached to said conveyor with the hinges of the cups forward with respect to the movement of the conveyor, a pair of receptacles positioned consecutively below the cups in a portion of the path of the conveyor, the movement of the conveyor in said portion being substantially horizontal, tripping means by which the latches may be actuated to dump the white compartments of said cups selectively into one or the other of said receptacles, a cam to engage the bottom of opened cups to pivot the opened white compartments about their hinges to re-engage said latches, and a third receptacle at another portion of said path to receive the contents of the yolk compartments of said cups.

4. An egg separating machine including an egg separating cup, a conveyor, a cup carrier attached to said conveyor and adapted to hold said cup and to move it along a predetermined path, a catch for said cup to attach the cup to the carrier, and actuating means to release said catch at a predetermined point in said path and to refasten said catch at a subsequent point in said path.

5. An egg separating machine including a frame, a plurality of egg separating cups, a pair of spaced endless conveyors mounted on said frame, power-driving means to move said conveyors along predetermined parallel paths, carrier means positioned between and attached to each of said conveyors to support said cups for movement along a given line, a catch mounted on each of said carrier means to attach the cups to the carrier means, said catch being moveable in a direction transverse to said paths to release and secure said cups to said carrier means, and actuating means to move said catch at a first point along said paths to release said cups and to move said catch at a second point long said paths to secure said cups.

6. An egg separating machine including a frame, a plurality of egg separating cups, a pair of spaced endless conveyors mounted on said frame, power-driving means to move said conveyors along predetermined parallel paths, carrier means positioned between and attached to each of said conveyors to support said cups for movement along a given line, a catch mounted on each of said carrier means to attach the cups to the carrier means, said catch being moveable in a direction transverse to said paths to release and secure said cups to said carrier means, actuating means to move said catch at a first point along said paths to release said cups and to move said catch at a second point along said paths to secure said cups, and a plurality of receptacles below said line to receive the separated eggs, each of said cups including a body, a small yolk compartment, a larger white compartment, said yolk compartment being attached to said body and positioned above said white compartment, a hinge attaching one side of said white compartment to said body, means to normally hold said white compartment under said yolk compartment, and clipper means pivotally attached to said body for movement toward and away from the upper edge of the yolk cups to sever the egg white about the periphery of the yolk, said frame including a cam periodically to contact said clipper means as each cup moves along said path to raise the clipper means and to drop the clipper means into engagement with the yolk compartment.

References Cited in the file of this patent

UNITED STATES PATENTS

| | | |
|---|---|---|
| 1,482,311 | Long | Jan. 29, 1924 |
| 1,747,432 | Eskholme | Feb. 18, 1930 |
| 1,795,118 | Hall | Mar. 3, 1931 |
| 2,090,963 | Reese | Aug. 24, 1937 |
| 2,397,698 | Sigler | Apr. 2, 1946 |
| 2,521,907 | Gill | Sept. 12, 1950 |
| 2,646,163 | Sigler | July 21, 1953 |